United States Patent
Landolf et al.

[11] Patent Number: 5,933,648
[45] Date of Patent: Aug. 3, 1999

[54] CONFIGURABLE ARBITRATION DEVICE FOR CONTROLLING THE ACCESS OF COMPONENTS TO AN ARBITER OR THE LIKE BASED ON A CONTROL INPUT

[75] Inventors: David Landolf, Beaverton; Brian Hedges, Hillsboro, both of Oreg.

[73] Assignee: Intel Corporation, Santa Clara, Calif.

[21] Appl. No.: 08/772,220

[22] Filed: Dec. 20, 1996

[51] Int. Cl.$^6$ .................................................... G06F 13/14
[52] U.S. Cl. ......................... 395/728; 395/287; 395/856; 395/733
[58] Field of Search ..................... 395/287–305, 395/728–732, 733–742, 856–865; 711/150, 151

[56] References Cited

U.S. PATENT DOCUMENTS 5,077,662  12/1991  Hutson ..................................... 395/737
5,708,813   1/1998  Cho et al. ............................... 395/733

OTHER PUBLICATIONS

Technical Product Summary–Classic/PCI Pentium CPU Baby—at Motherboard, Premlininary Version 0.1 Dated Apr. 1993

Primary Examiner—Ayaz R. Sheikh
Assistant Examiner—Sumati Lefkowitz
Attorney, Agent, or Firm—Kenyon & Kenyon

[57] ABSTRACT

A number, Y, of ports are coupled to a common bus and to a bus arbitration extension device. The extension device is coupled to X pairs of arbitration signal lines, where X is less than Y. The extension device controls the assertion and receipt of request and grant signal in response to a control input which can be controlled by the operation of system software or BIOS. For example, two of the ports share one pair of arbitration signal lines under the control of the extension device and its control input. In a preferred embodiment of the present invention, a port that is empty or contains a non bus master device or a device that infrequently initiates transfers over the bus shares arbitration signal lines with a standard bus master device. The bus arbitration extension device allows for selectively controlling the access of components to an arbiter or the like based on the control input.

30 Claims, 6 Drawing Sheets

CONFIGURABLE ARBITRATION DEVICE FOR CONTROLLING THE ACCESS OF COMPONENTS TO AN ARBITER OR THE LIKE BASED ON A CONTROL INPUT

BACKGROUND OF THE INVENTION

The present invention pertains to a configurable arbitration device, and more particularly to a method and apparatus for arbitrating bus access between devices where a normal bus arbitration signal pair is shared by two or more devices.

Figure 1:
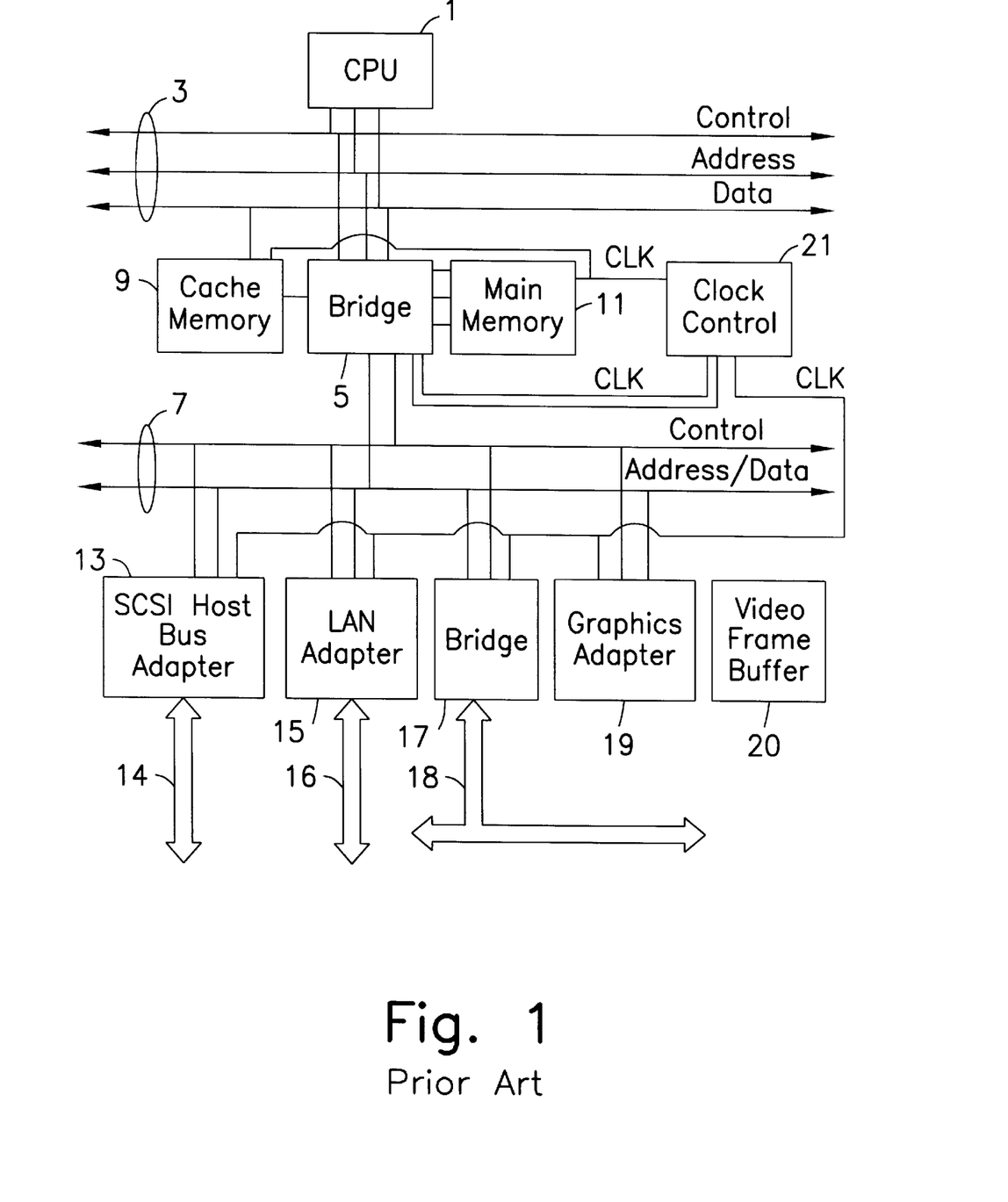
FIG. 1 is a block diagram of a PCI system that is known in the art.

A bus system is defined generally as a series of communication lines coupled between a plurality of components. A typical bus system architecture is the Peripheral Component Interconnect (PCI) system Version 2.1, 1995 (PCI Special Interest Group, Portland, Oreg.). Referring to FIG. 1, an example of a bus system operated according to the PCI architecture is shown. In FIG. 1, a central processing unit (CPU) 1 is coupled to a host bus 3 having control, address and data lines. A first bridge circuit 5 (also referred to as a host/PCI bridge or north bridge) is coupled between host bus 3 and a PCI bus 7. The first bridge circuit 5 is flier coupled to a cache memory 9 and main memory 11. Coupled to the PCI bus are one or more PCI components such as a Small Computer Standard Interface (SCSI) Host Bus Adapter 13 (which in turn is coupled to a SCSI bus 14), a Local Area Network (LAN) Adapter 15 (which in turn is coupled to a LAN 16, an Expansion Bus bridge 17 (which in turn is coupled to an Expansion bus, such as an EISA bus 18), and a Graphics Adapter 19 (which in turn is coupled to a Video Frame Buffer 20). Clocking signals to a variety of the aforementioned devices can be supplied by a central clock control 21.

Figure 2:
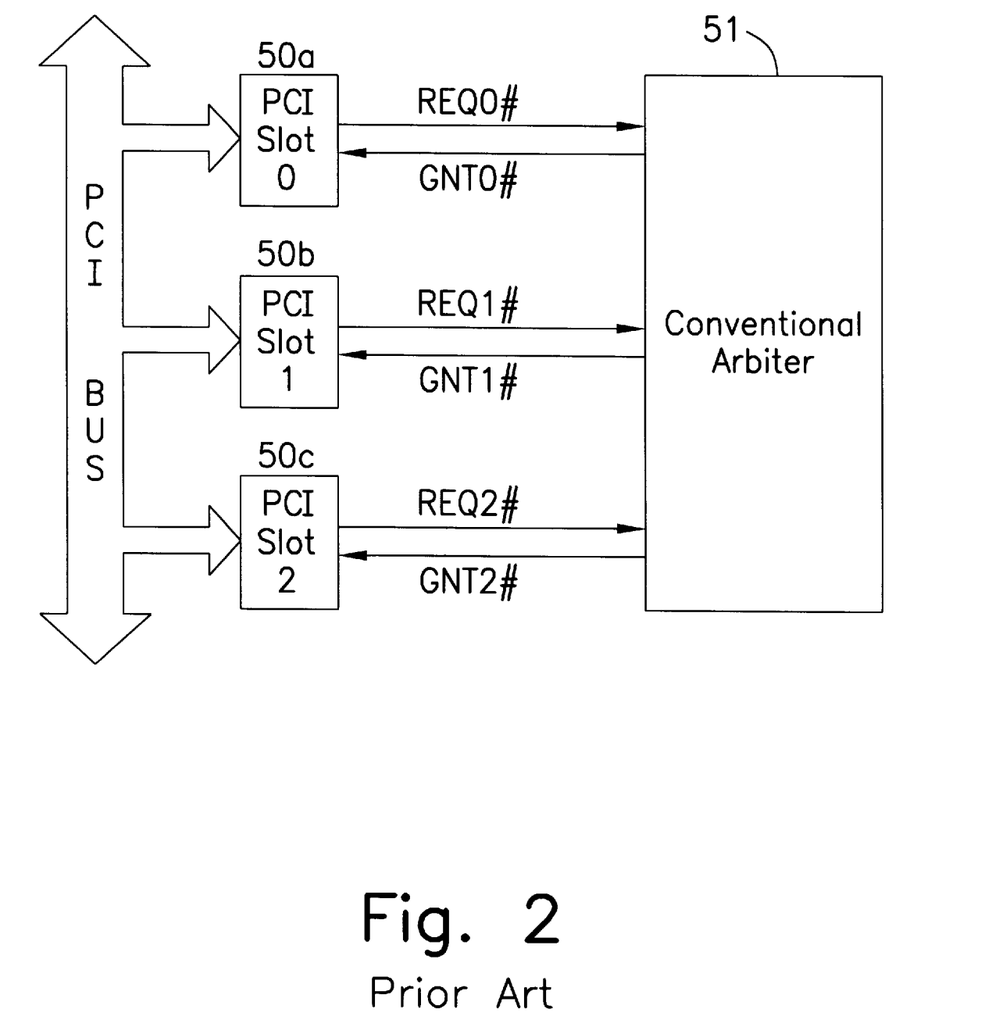
FIG. 2 is a block diagram of an arbitration system known in the art.

As is known in the art, arbitration circuitry is required to award control of a bus to one device. In the PCI system, as shown in FIG. 2, a PCI device (e.g., device 50a) obtains control of the PCI bus by first asserting its REQ# signal (the "#" sign indicates a signal that is negatively asserted). All of the PCI devices that can initiate transfers on the bus are coupled via individual REQ# signal lines to a conventional arbiter 51. Through the use of the appropriate GNT# signal line coupled between each PCI device and arbiter 51, arbiter 51 controls which of devices 50a–c is given control of the bus. There are several well-known arbitration protocols or schemes in the art. For example, in a "round-robin" arbitration scheme, a device that is given control of the bus is subsequently given a lower priority for the next arbitration. Thus, after device 50a is given control of the bus by arbiter 51, if device 50a seeks to immediately obtain control of the bus at the same time as another device, control will be given to the other device coupled to the bus (e.g., 50b). Accordingly, device 50b would now have the lowest priority in the system. Once a device is given control of the bus, it can then commence a data transfer with another device coupled to the PCI bus as is described in the aforementioned PCI bus architecture.

In FIG. 2, there are three devices 50a–c shown which have REQ# and GNT# lines coupled to arbiter 51. A chip set for implementing a PCI system may have only four REQ/GNT signal line pairs for ports coupled to the PCI bus. A port is defined as a physical slot (e.g., an expansion connector) for insertion of a device (e.g., a card) or a resource coupled to the motherboard. There may, however, be a need for more ports to have access to the PCI bus and the arbiter. Accordingly, there is a need for a method and apparatus that addresses the problem of giving more ports access to the REQ/GNT lines of a conventional arbiter. Since configurations for bus systems can change, there is also a need for a method and apparatus that allow for changing the configuration of the arbitration system.

SUMMARY OF THE INVENTION

The present invention provides an improvement for a bus arbitration system comprising an arbiter having a plurality of pairs of arbitration signal lines, where each pair of arbitration signal lines includes a request input signal line and a corresponding grant output signal line. A bus arbitration extension device is provided having a control input and is coupled to X of the pairs of arbitration signal lines to the arbiter. That is, the extension device supplies request signals to the arbiter on the X request input signal lines and receives grant signals on the X grant output lines from the arbiter. The arbitration system also includes Y ports coupled to a bus, where Y is greater than X, and each port is adapted to receive a device capable of interacting with the bus. The bus arbitration extension device controls access of the Y ports to the X pairs of arbitration signal lines based on the control input. According to a preferred embodiment of the present invention, the operation of system software or BIOS, controls the control input of the bus arbitration extension device based on a configuration of the ports coupled to the bus.

With the system of the present invention, a port that is empty or contains a device that is a non-bus mastering device or a bus master device that is used infrequently to initiate transfers on the bus shares a pair of arbitration signal lines with another device under the control of the control input to the arbitration extension device. Using the method and apparatus of the present invention, a greater number of devices can be efficiently coupled to a limited number of arbitration signal line pairs to/from the arbiter. The method and apparatus of the present invention can be extended to other areas requiring arbitration, such as interrupt generation. For example if a device has X interrupt inputs signal lines, Y ports can be coupled to those interrupt lines via an arbitration device operating in a manner similar to the arbitration extension device mentioned above. In other words, based on a control input, the arbitration device determines which interrupt line from the Y ports passes through to the device (e.g., a microprocessor) and which ports share an interrupt line(s).

DETAILED DESCRIPTION

Figure 3:
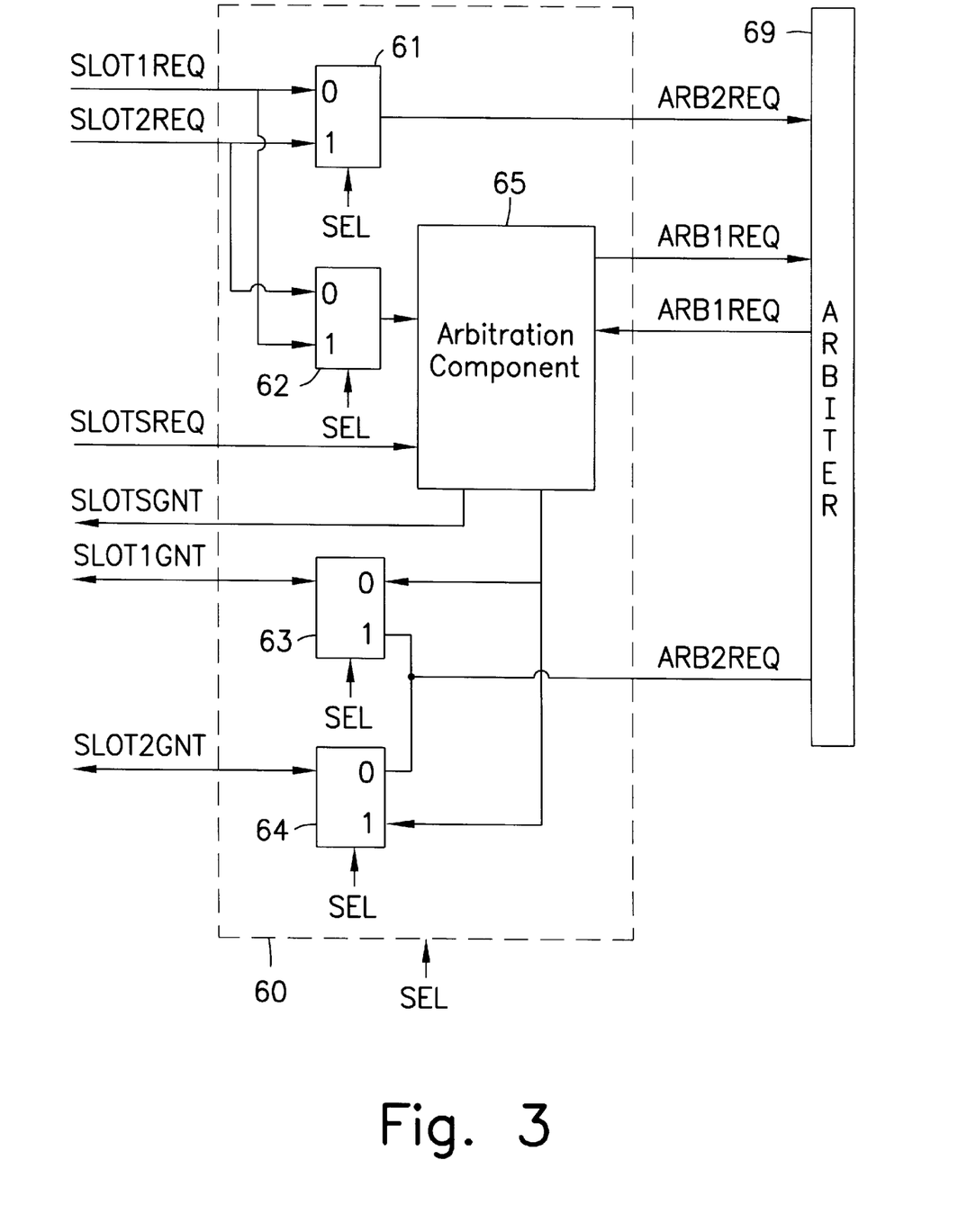
FIG. 3 is a block diagram of a first embodiment of a configurable bus arbitration extension device and bus system constructed according to the present invention.

Referring to FIG. 3, a block diagram of a first embodiment of a configurable bus arbitration extension device 60 is shown constructed according to the present invention. In this embodiment arbitration extension device 60 is coupled between a arbiter 69 having two pairs of request/grant signal lines (i.e., ARB1REQ/ARB1GNT and ARB2REQ/ARB2GNT) and three ports. In this embodiment, the three ports are slots 1, 2, and S (e.g., extension connectors) each having a pair of request/grant signal lines (SLOT1REQ/SLOT1GNT, SLOT2REQ/SLOT2GNT, and SLOTSREQ/SLOTSGNT, respectively) coupled to arbitration extension device 60. Since only two request/grant signal pairs are available to arbiter 69, the first pair (i.e., ARB1REQ/ARB2GNT) of signal lines are shared between slot S and either slot 1 or slot 2 as described below.

SLOT1REQ is input to the first input of a first multiplexer 61 and the second input of a second mulitplexer 62. SLOT2REQ is input to the second input of a first multiplexer 61 and the first input of a second multiplexer 62. A control input to the arbitration extension device 60 (i.e., SEL) controls the output of the two multiplexers 61, 62 so that one request signal is "passed through" extension device 60 to the ARB2REQ signal input of arbiter 69 and the other request signal is sent to an arbitration component 65 in extension device 60. If SEL has a 0 value then the SLOT1REQ signal is passed through and the SLOT2REQ signal goes to arbitration component 65. If SEL has a 1 value then the SLOT2REQ signal is passed through and the SLOT1REQ signal goes to arbitration component 65. The arbitration component 65 also receives the request input from slot S (i.e., SLOTSREQ). In this embodiment, arbitration component 65 selects which request signal to coupled to the ARB1REQ signal input of arbiter 69 based on the well-known round-robin protocol. After the ARB1GNT signal is received from arbiter 69, arbitration component 65 determines whether it is for slot S or for the slot sharing the ARB1GNT line. If it is for slot S, then the signal is coupled to the SLOTSGNT output. If it is for the other slot then the ARB1GNT signal is supplied to the first input of a third multiplexer 63 and the second input of a fourth multiplexer 64. The ARB2GNT signal is supplied to the second input of a third multiplexer 63 and the first input of a fourth multiplexer 64. The SEL input controls the two multiplexers 63, 64 so that the third multiplexer 63 supplies the SLOT1GNT signal and the fourth multiplexer 64 supplies the SLOT2GNT signal. If SEL is set to a 0 value, then the ARB2GNT signal is passed through to the SLOT2GNT output while the SLOT1GNT signal is supplied by arbitration component 65. If SEL is set to a 1 value, then the ARB1GNT signal is passed through to the SLOT1GNT output while the SLOT2GNT signal is supplied by arbitration component 65. In this embodiment, arbitration component 65 is one of a variety of Programmed Array Logic (PAL) devices implementing a state machine.

Figure 4:
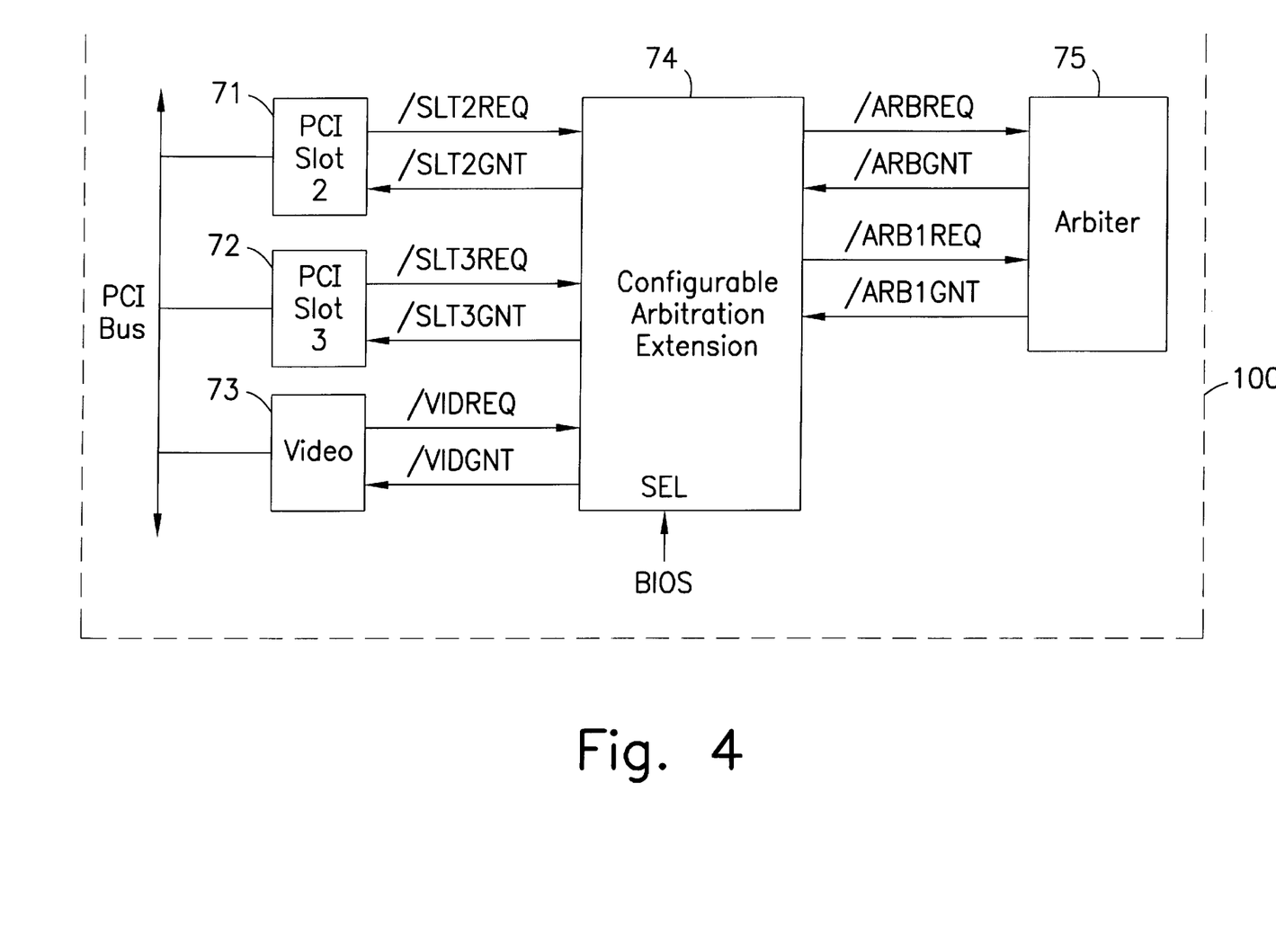
FIG. 4 is a block diagram of a second embodiment of a configurable bus arbitration extension device and bus system constructed according to the present invention.

Referring to FIG. 4, a block diagram of a second embodiment of a configurable bus arbitration extension device 74 constructed according to the present invention is shown. In this embodiment of the present invention, arbiter extension 74 is one of a variety of Programmed Array Logic (PAL) devices implementing a state machine. One skilled in the art will appreciate that the arbiter extension device of FIG. 4 and arbitration component 65 of extension device 60 of FIG. 3 can be implemented in a variety of other designs such as a microcontroller executing code, an Application Specific Integrated Circuit (ASIC), a combinatorial logic circuit, etc.

In the embodiment shown in FIG. 4, there are three ports coupled to arbiter extension 74: PCI slot 2 (71), PCI slot 3 (72), and video controller 73 (each of these ports is in turn directly coupled to the PCI bus). Each port 71, 72, 73 has an available output signal line for asserting a request signal to arbitration extension 74 (/SLT2REQ, /SLT3REQ, /VIDREQ, respectively). The "/" indicates negatively asserted signals. Each port 71, 72, 73 also has an available input signal line for receipt of a corresponding grant signal from arbitration extension 74 (/SLT2GNT, /SLT3GNT, and /VIDGNT, respectively). In this embodiment, arbitration extension 74 asserts two request signals, /ARBREQ and /ARB1REQ on behalf of the three PCI ports 71–73 to arbiter 75. Accordingly, arbitration extension 74 receives grant signals from arbiter 75, /ARBGNT and /ARB1GNT on behalf of PCI ports 71–73. The configurable arbitration extension 74 also receives a control input SEL to select the type of operation for extension 74 as described below.

In a configuration for a PCI system, it is possible that a PCI port (e.g., PCI slot 3 (72) or slot S in FIG. 3) will be empty, will contain a non-bus master device (i.e., a device that is incapable of initiating a transfer over the PCI bus and does not require the use of request or grant signals), or will be a device that infrequently initiates transfers on the PCI bus (e.g., initiates a transfer over the bus at a rate less than 10% of that for an average bus master device). Also, the device in PCI slot 3 may be one whose operation is not critical to the system. Since available pins and signal lines for bus arbitration may be limited, it may be advantageous not to dedicate request and grant signal lines for such a PCI slot. Accordingly, through the use of the SEL input to the arbitration extension 74, a port (such as PCI slot 3 (72)) will share request and grant signal lines to bus arbiter 75 with another port. More specifically, with respect to the exemplary embodiment of FIG. 4, the SEL input signal controls whether PCI slot 3 will share request/grant signal lines with PCI slot 2 (71) or video controller 73. The device that is not sharing request/grant signal lines with PCI slot 3 has its request/grant signal lines "pass through" arbitration extension 74 to/from arbiter 75.

Figure 5:
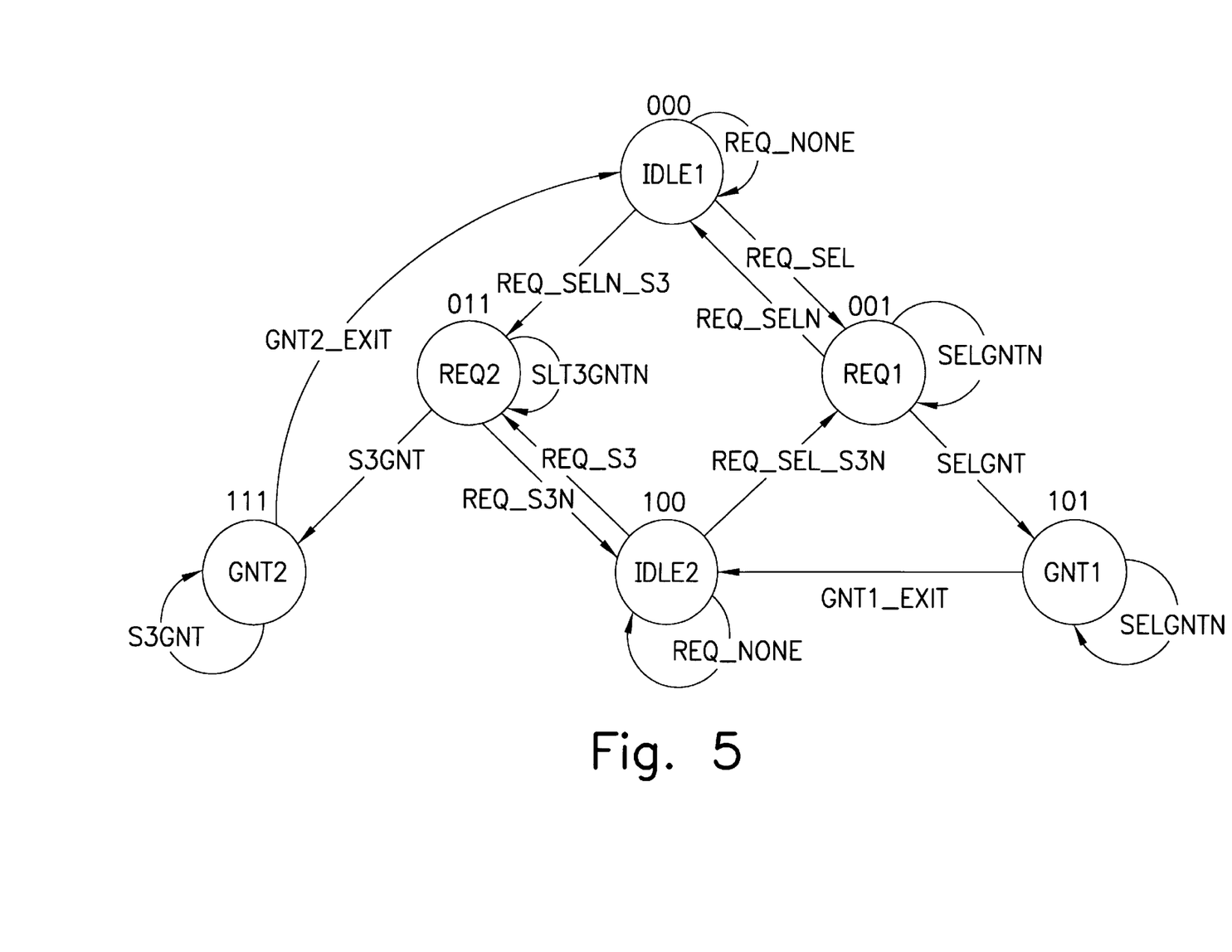
FIG. 5 is a state diagram showing the operation of the configurable bus arbitration extension device of FIG. 4.

Referring to FIG. 5, a state machine flow diagram for arbitration extension 74 is shown. In this embodiment, there are three state variables, S0, S1, and ARBREQ whose values are shown above each of the defined states. The default state is IDLE1 where all three variables are set to 0 values (thus the shared arbitration request signal, ARBREQ, is not asserted to arbiter 75). Two preliminary equations for the operation of the arbiter extension 74 are as follows:

SELREQ=(SLT2REQ)(SEL)+(VIDREQ)(/SEL)    (Eq. 1)

ARB1REQ=(SLT2REQ)(/SEL)+(VIDREQ)(SEL)    (Eq. 2)

where "/" indicates negation. In Eqs. 1 and 2, SLT2REQ will have a 1 value when the device in PCI slot 2 (71) asserts its request signal. Likewise, VIDREQ will have a 1 value when video controller 73 asserts its request signal. From Eqs. 1 and 2, if SEL is set to a 1 value, then the value for VIDREQ is irrelevant (i.e., "don't care") in defining the SELREQ value and directly controls the value for ARB1REQ. Therefore, when SEL is set to a 1 value, the request signal from video controller 73 passes through directly to arbiter 75. Likewise, if SEL has a 0 value, ARB1REQ will represent the passed through value of SLT2REQ and VIDREQ will control the value for SELREQ. Thus, the variables for ARB1REQ and SELREQ perform similar functions to the first and second multiplexers 61, 62 of the embodiment shown in FIG. 3.

Referring back to FIG. 4, if the variable REQ_NONE has a 1 value, then the operation of the state machine remains in the IDLE1 state (ARBREQ remains deasserted), where REQ_NONE=(/SELREQ)(/SLT3REQ)+ARBGNT.    (Eq. 3)

If /SELREQ has a 1 value, then the PCI slot that is sharing request/grant signal lines with PCI slot 3 (72) has not asserted a request signal. If ARBGNT has a 1 value, then either of the two ports sharing the request/grant signal lines has already been granted control of the PCI bus. In summary, the REQ_NONE variable will normally have a 1 value as long as neither of the two ports sharing request/grant signal lines to arbiter 75 have newly asserted a request signal.

Operation of the state machine transfers to state REQ1 (001) when the REQ_SEL variable has a 1 value, where $$REQ\_SEL=(SELREQ)(/ARBGNT). \tag{Eq. 4}$$

Assuming that neither of the PCI slots sharing request/grant signal lines to the arbiter have been granted control of the PCI bus (thus /ARBGNT has a 1 value), then the SELREQ value goes high when the port sharing its request/grant signal lines with PCI slot 3 (72) asserts a request signal. In transferring to state REQ1, the ARBREQ signal is asserted to arbiter 75. The operation of the state machine remains in state REQ1 while the variable SELGNTN has a 1 value, where $$SELGNTN=(SELREQ)(/ARBGNT). \tag{Eq. 5}$$

Operation of the state machine transfers back to state IDLE1 when REQ_SELN has a 1 value, where $$REQ\_SELN=/SELREQ \tag{Eq. 6}$$

indicating that the request signal that caused transfer to state REQ1 has been deasserted. Accordingly, the ARBREQ signal is also deasserted. Operation of the state machine transfers from state REQ1 to state GNT1 (101) when SELGNT has a 1 value, where $$SELGNT=(SELREQ)(ARBGNT). \tag{Eq. 7}$$

SELGNT becomes asserted while the shared device maintains an asserted request signal and a grant signal is received from arbiter 75. Operation of the state machine remains in state GNT1 while the SELGNT variable has a 1 value. Operation of the state machine transfers to state IDLE2 (100) when GNT1_EXIT has a 1 value, where $$GNT1\_EXIT=/SELREQ+/ARBGNT \tag{Eq. 8}$$

indicating that the shared device that had made the request has deasserted the request signal or arbiter 75 has deasserted the grant signal associated with that request signal.

The path from state IDLE1 to state REQ1 and state GNT1 favors the port that is sharing request/grant signal lines with PCI slot 3. From state IDLE2, PCI slot 3 is given priority over the other shared port according to the typical round-robin arbitration scheme. Operation of the state machine remains in state IDLE2 while REQ_NONE has a 1 value (see above). When REQ_SEL_S3N has a 1 value, operation of the state machine transfers back to state REQ1, where $$REQ\_SEL\_S3N=(SELREQ)(/SLT3REQ)(/ARBGNT). \tag{Eq. 9}$$

Thus, operation returns to handle the request of the port sharing request/grant lines with PCI slot 3 (72) as long as PCI slot 3 has not asserted its request signal and the grant signal for either of those ports has not been asserted. Operation transfers from state IDLE2 to REQ2 when the variable REQ_S3 has a 1 value, where $$REQ\_S3=(SLT3REQ)(/ARBGNT). \tag{Eq. 10}$$

Thus, from state IDLE2, priority is given to PCI slot 3 (72) over the other port sharing the request/grant signal lines.

Operation of the state machine transfers from REQ2 to state IDLE2 when the variable REQ_S3N has a 1 value, where $$REQ\_S3N=/SLT3REQ \tag{Eq. 11}$$

which operates in a manner similar to the use of the variable REQ_SELN described above. Operation of the state machine transfers from state IDLE1 (000) to state REQ2 when the variable REQ_SELN_S3 has a 1 value, where $$REQ\_SELN\_S3=(/SELREQ)(SLT3REQ)(/ARBGNT). \tag{Eq. 12}$$

Thus, arbitration extension device 74 will assert the /ARBREQ signal on behalf of PCI slot 3 (72) when the shared port has not asserted its request signal and the /ARBGNT signal is not asserted. Operation of the state machine remains in state REQ2 while the variable SLT3GNTN has a 1 value, where $$SLT3GNTN=(SLT3REQ)(/ARBGNT). \tag{Eq. 13}$$

Thus, the operation of the state machine remains in state REQ2 (011) with /ARBREQ asserted while the request signal from PCI slot 3 (72) remains asserted and the /ARBGNT signal is not asserted. Operation of the state machine transfers to state GNT2 (111) and remains in that state when the variable S3GNT has a 1 value, where $$S3GNT=(SLT3REQ)(ARBGNT). \tag{Eq. 14}$$

Thus, the operation of the state machine goes to and remains in state GNT2 when the request signal from PCI slot 3 (72) is asserted and the ARBGNT signal is asserted. When variable GNT2_EXIT has a 1 value, control transfers to state IDLE1 (000) and the ARBREQ signal is deasserted, where:

$$GNT2\_EXIT=/SLT3REQ+/ARBGNT \tag{Eq. 15}$$

which operates in a manner similar to the operation in response to the variable GNT1_EXIT.

The appropriate grant signals asserted by arbitration extension device 74 (i.e., SLT3GNT, SLT2GNT, and VIDGNT) are handled during the states shown in FIG. 4 based on the values for SEL, ARBGNT, and ARB1GNT. For the states IDLE1 (000), REQ2 (011), and GNT2 (111) the grant signals, SLT3GNT, SLT2GNT, VIDGNT are asserted in the manner according to Table I:

TABLE I

| Inputs | | | Outputs | | |
|---|---|---|---|---|---|
| SEL | ARBGNT | ARB1GNT | SLT3GNT | SLT2GNT | VIDGNT |
| 1 | 1 | 0 | 1 | 0 | 0 |
| 0 | 1 | 0 | 1 | 0 | 0 |
| 1 | 0 | 1 | 0 | 0 | 1 |
| 0 | 0 | 1 | 0 | 1 | 0 |
| Don't Care | 0 | 0 | 0 | 0 | 0 |

For the states IDLE2 (100), REQ1 (001), and GNT1 (101) the grant signals are asserted in the manner according to Table II:

TABLE II

| | Inputs | | Outputs | | |
|---|---|---|---|---|---|
| SEL | ARBGNT | ARB1GNT | SLT3GNT | SLT2GNT | VIDGNT |
| 1 | 1 | 0 | 0 | 1 | 0 |
| 0 | 1 | 0 | 0 | 0 | 1 |
| 1 | 0 | 1 | 0 | 0 | 1 |
| 0 | 0 | 1 | 0 | 1 | 0 |
| Don't Care | 0 | 0 | 0 | 0 | 0 |

Omitted from Tables I and II are the illegal situations where ARBGNT and ARB1GNT are both asserted.

The arbitration extension 74 is configurable in that the value input for SEL controls which ports share request/grant signal lines to arbiter 75. Basic Input Output System (BIOS) software or other system software can scan the configuration of the system 100 and optimize the arbitration sharing mechanism of device 74. For example, if BIOS determines that PCI slot 2 (71) contains a bus mastering device, PCI slot 3 (72) contains a non-bus master sound card, then BIOS would place the appropriate value at the SEL input of the extension device to choose whether PCI slot 2 (71) and PCI slot 3 (72) should share bus arbitration lines or whether video controller (73) and PCI slot 3 (72) should share bus arbitration lines as described above. Though the present invention has been described in a PCI architecture, one skilled in the art will appreciate that the present invention can be readily used in other bus architectures as well.

In the example shown in FIGS. 3 and 4, three ports assert request/grant signals through arbitration extension 74 to two pairs of bus arbitration lines. The present invention can be expanded to include a number of additional ports. Thus, an arbitration extension device constructed and operated according to the present invention can connect Y ports to X pairs of arbitration signal lines to a arbiter, where Y is greater than X. In the example shown in FIGS. 3 and 4, X would be 2 and Y would be 3. As more ports are added to the system, and more options for sharing are presented to BIOS or other system software, additional SEL control input lines will become necessary.

Figure 6:
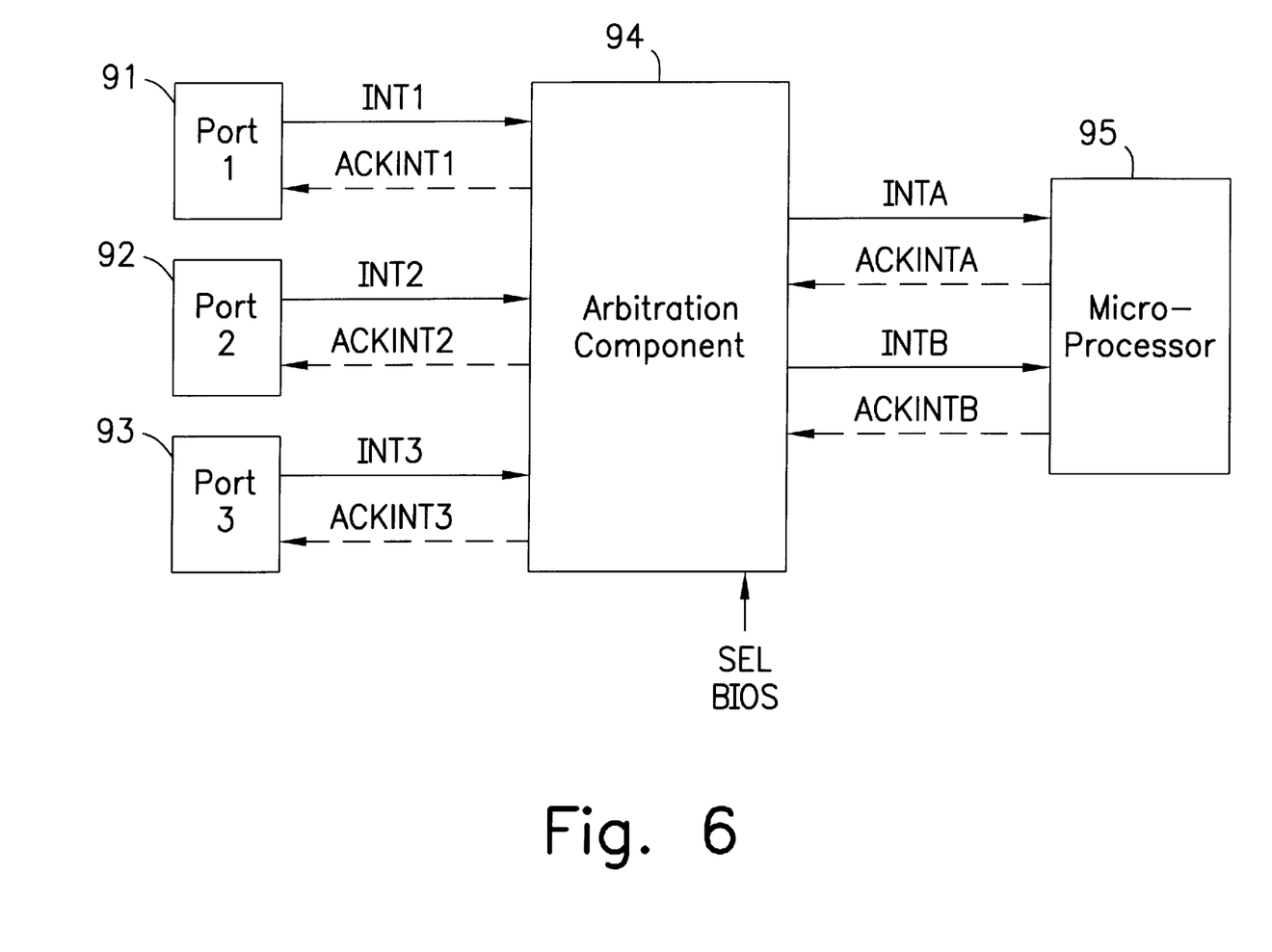
FIG. 6 is a block diagram of an arbitration component constructed according to the present invention for supplying interrupt signals to a microprocessor.

The present invention can also be used for the generation of interrupts. Referring to FIG. 6, an embodiment of an arbitration component for asserting interrupts is shown. The arbitration component 94 is coupled between three ports 91, 92, 93 and a device, such as microprocessor 95. The microprocessor 95 has two interrupt signal lines, INTA and INTB. In accordance with the operation of the arbitration extension devices of FIGS. 3 and 4, the arbitration component 94 of FIG. 6 selects which of the interrupts generated by the ports (i.e., INT1, INT2, or INT3) is passed through to the INTA signal line and which two ports share the INTB signal line based on the SEL input. If desired, an interrupt acknowledge can be provided in a similar manner to acknowledge the receipt of the INTA or INTB interrupts (ACKINTA or ACKINTB, respectively). The interrupt acknowledge signals from microprocessor 95 are then directed to the appropriate port 91–93 by arbitration component 94 as output signals ACKINT1, ACKINT2, and ACKINT3. The SEL input can be controlled in a manner similar to the arbitration extension devices of FIGS. 3 and 4 (e.g., by BIOS or other system software).

Although several embodiments are specifically illustrated and described herein, it will be appreciated that modifications and variations of the present invention are covered by the above teachings and within the purview of the appended claims without departing from the spirit and intended scope of the invention.

What is claimed is:

1. A bus arbitration system comprising:
    an arbiter having a plurality of pairs of arbitration signal lines, each pair of arbitration signal lines including a request input signal line and a corresponding grant output signal line;
    a bus arbitration extension device having a control input and being coupled to X of said pairs of arbitration signal lines where said extension device supplies request signals to said arbiter on said request input signal lines and receives grant signals from said arbiter on said grant output signal lines; and
    Y ports coupled to a bus, where Y is greater than X, and said arbiter controls which of said Y ports has control of said bus via said bus extension device, each port adapted to receive a device capable of interacting with said bus, each of said ports coupled to said bus arbitration extension device via a pair of arbitration signal lines including a request output signal line and a grant input signal line, where said bus arbitration extension device controls which of said Y ports share access to at least one of said X pairs of arbitration signal lines based on said control input.

2. The bus arbitration system of claim 1 wherein operation of system software controls the control input of said bus arbitration extension device based on a configuration of said ports coupled to the bus.

3. The bus arbitration system of claim 2 wherein said system software is Basic Input Output System (BIOS) software.

4. The bus arbitration system of claim 2 wherein two of said Y ports share one of said X pairs of bus arbitration signal lines via said bus arbitration extension device.

5. The bus arbitration system of claim 4 wherein one of the two of said Y ports is empty.

6. The bus arbitration system of claim 4 wherein one of the two of said Y ports contains a non-bus master device.

7. The bus arbitration system of claim 4 wherein one of the two of said Y ports contains a bus master device that infrequently initiates transfers over said bus.

8. A bus arbitration system comprising:
    an arbiter having a plurality of pairs of arbitration signal lines, each pair of arbitration signal lines including a request input signal line and a corresponding grant output signal line;
    a bus arbitration extension device having a control input and being coupled to two of said pairs of arbitration signal lines where said extension device supplies request signals to said arbiter on said request input signal lines and receives grant signals from said arbiter on said grant output signal lines; and
    three ports coupled to a bus, where said arbiter controls which of said three ports has control of said bus, each port adapted to receive a device capable of interacting with said bus, each of said ports coupled to said bus arbitration extension device via a pair of arbitration signal lines including a request output signal line and a grant input signal line, where said bus arbitration extension device controls which of said three ports share access to at least one of said two pairs of arbitration signal lines based on said control input.

9. The bus arbitration system of claim 8 wherein operation of system software controls the control input of said bus arbitration extension device based on a configuration of said ports coupled to the bus.

10. The bus arbitration system of claim 9 wherein said system software is Basic Input Output System (BIOS) software.

11. The bus arbitration system of claim 9 wherein two of said ports share one of said pairs of bus arbitration signal lines via said bus arbitration extension device.

12. The bus arbitration system of claim 11 wherein one of said ports sharing one of said pairs of bus arbitration lines is empty.

13. The bus arbitration system of claim 11 wherein one of said ports sharing one of said pairs of bus arbitration lines contains a non-bus master device.

14. The bus arbitration system of claim 11 wherein one of said ports sharing one of said pairs of bus arbitration lines contains a bus master device that infrequently initiates transfers over said bus.

15. The bus arbitration system of claim 9 wherein a first one of said ports contain a bus master device and a second one of said ports contains a video controller and said bus arbitration extension device determines which of said first and second ports shares one of said pairs of bus arbitration lines based on said control input.

16. A method of controlling arbitration between Y devices coupled to a bus via X pairs of arbitration signal lines, where Y is greater than X, the method comprising:
   (a) supplying request signals from said Y devices to an arbitration extension device;
   (b) selecting which of said request signals to supply to an arbiter via at least one of said X pairs of arbitration signal lines based on a control input to said arbitration extension device;
   (c) receiving a grant signal at said arbitration extension device from said arbiter in response to said request signal supplied to said arbiter; and
   (d) supplying said grant signal to an appropriate one of said Y devices having access to said bus.

17. The method according to claim 16 further comprising:
   (e) controlling said control input to said arbitration extension device via the operation of system software.

18. The bus arbitration system of claim 17 wherein said system software is Basic Input Output System (BIOS) software.

19. The method according to claim 17 wherein two of said Y ports share one of said X pairs of bus arbitration signal lines via said bus arbitration extension device.

20. The method according to claim 19 wherein one of the two of said Y ports is empty.

21. The method according to claim 19 wherein one of the two of said Y ports contains a non-bus master device.

22. The method according to claim 19 wherein one of the two of said Y ports contains a bus master device that infrequently initiates transfers over said bus.

23. An arbitration system comprising:
   a device having a plurality of interrupt input signal lines;
   an arbitration component having a control input and being coupled to X of said interrupt input signal lines where said arbitration component supplies interrupt signals to said device; and
   Y ports coupled to said arbitration component, where Y is greater than X, each port adapted to receive a device capable of asserting an interrupt signal, each of said ports coupled to said arbitration component via an interrupt signal line, where said arbitration component controls which of said Y ports share access to at least one of said X interrupt signal lines based on said control input.

24. The arbitration system of claim 23 wherein operation of system software controls the control input of said arbitration component based on a configuration of said ports.

25. The arbitration system of claim 24 wherein said system software is Basic Input Output System (BIOS) software.

26. The bus arbitration system of claim 24 wherein two of said Y ports share one of said X interrupt signal lines via said arbitration component.

27. A method of controlling arbitration between Y devices coupled to a device via X interrupt signal lines, where Y is greater than X, the method comprising:
   (a) supplying interrupt signals from said Y devices to an arbitration component; and
   (b) selecting which of said interrupt signals to supply to a device via at least one of said X interrupt signal lines based on a control input to said arbitration component.

28. The method according to claim 27 further comprising:
   (c) controlling said control input to said arbitration component via the operation of system software.

29. The method according to claim 28 wherein said system software is Basic Input Output System (BIOS) software.

30. The method according to claim 28 wherein two of said Y ports share one of said X interrupt signal lines via said arbitration component.

* * * * *

UNITED STATES PATENT AND TRADEMARK OFFICE
CERTIFICATE OF CORRECTION

PATENT NO. : 5,933,648
DATED : August 3,1999
INVENTOR(S) : Landolf et al.

It is certified that error appears in the above-identified patent and that said Letters Patent is hereby corrected as shown below:

Column 1, line 22     "flier coupled" should be --further coupled--

Column 3, line 29     "to coupled" should be --to couple--

Column 9, line 18     "contain a bus" should be --contains a bus--

Signed and Sealed this

Sixth Day of June, 2000

Attest:

Q. TODD DICKINSON

*Attesting Officer*     *Director of Patents and Trademarks*